US010747325B2

(12) United States Patent
Khoshkava

(10) Patent No.: US 10,747,325 B2
(45) Date of Patent: *Aug. 18, 2020

(54) SYSTEMS AND METHODS FOR LONG-RANGE INTERACTIONS FOR VIRTUAL REALITY

(71) Applicant: Immersion Corporation, San Jose, CA (US)

(72) Inventor: Vahid Khoshkava, Montreal (CA)

(73) Assignee: Immersion Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,415

(22) Filed: Apr. 19, 2019

(65) Prior Publication Data
US 2019/0250712 A1  Aug. 15, 2019

Related U.S. Application Data

(63) Continuation of application No. 15/857,559, filed on Dec. 28, 2017.

(51) Int. Cl.
*G09G 5/00* (2006.01)
*G06F 3/01* (2006.01)
(Continued)

(52) U.S. Cl.
CPC .............. *G06F 3/016* (2013.01); *A63F 13/20* (2014.09); *G06F 3/011* (2013.01); *G06F 3/0346* (2013.01)

(58) Field of Classification Search
CPC ........ G06F 3/011; G06F 3/016; G06F 3/0325; G06F 3/033; G06F 3/0346; G06F 3/03545; G06F 3/046
See application file for complete search history.

(56) References Cited

U.S. PATENT DOCUMENTS 6,243,078 B1   6/2001   Rosenberg
6,483,499 B1   11/2002  Li et al.
(Continued)

FOREIGN PATENT DOCUMENTS

EP   2407863 A2   1/2012
JP   2000-250689 A   9/2000
(Continued)

OTHER PUBLICATIONS

Translation of Japanese Pub. No. JP 2000-259074 A, Sep. 22, 2000, 12 pages.*
(Continued)

*Primary Examiner* — Joe H Cheng
(74) *Attorney, Agent, or Firm* — Kilpatrick Townsend & Stockton LLP

(57) ABSTRACT

Systems and methods long-range interactions for virtual reality are disclosed. One disclosed system includes: a handheld interface device; a sensor configured to detect movement of the handheld interface device and transmit a sensor signal associated with the movement; a processor coupled to the sensor and configured to: determine a haptic signal based in part on the sensor signal; and control, based on the haptic signal, an electromagnetic source remote from the handheld interface device to output a magnetic field to apply a force to magnetic material in the handheld interface device to output a haptic effect to a user of the handheld interface device.

17 Claims, 4 Drawing Sheets

(51) Int. Cl.
*G06F 3/0346* (2013.01)
*A63F 13/20* (2014.01)

(56) References Cited

U.S. PATENT DOCUMENTS

| | | | |
|---|---|---|---|
| 6,686,901 | B2 | 2/2004 | Rosenberg |
| 6,697,044 | B2 | 2/2004 | Shahoian et al. |
| 7,106,313 | B2 | 9/2006 | Schena et al. |
| 9,030,307 | B1 | 5/2015 | Lee et al. |
| 2006/0209019 | A1 | 9/2006 | Hu |
| 2006/0241864 | A1 | 10/2006 | Rosenberg |
| 2008/0059138 | A1 | 3/2008 | Tremblay et al. |
| 2009/0295552 | A1 | 12/2009 | Shahoian et al. |
| 2010/0227527 | A1 | 9/2010 | Smoot et al. |
| 2010/0245237 | A1 | 9/2010 | Nakamura |
| 2014/0168175 | A1 | 6/2014 | Mercea et al. |
| 2015/0362994 | A1* | 12/2015 | Rihn ................ G06F 3/016 345/156 |
| 2016/0189427 | A1 | 6/2016 | Wu et al. |
| 2016/0258758 | A1* | 9/2016 | Houston ............. G01C 21/20 |
| 2017/0028557 | A1 | 2/2017 | Battisti |
| 2017/0329393 | A1 | 11/2017 | Ryu et al. |
| 2019/0204918 | A1* | 7/2019 | Khoshkava ........... A63F 13/20 |

FOREIGN PATENT DOCUMENTS

| | | |
|---|---|---|
| JP | 2000-259074 A | 9/2000 |
| JP | 2010-003312 A | 1/2010 |
| JP | 2012-022639 A | 2/2012 |
| JP | 10-1680265 B1 | 11/2016 |
| KR | 10-1578345 B1 | 12/2015 |
| KR | 10-2016-0081809 A | 7/2016 |
| WO | 2007/114225 A1 | 10/2007 |
| WO | 2009/035100 A1 | 3/2009 |

OTHER PUBLICATIONS

"World's First Magnetic Hose Created", via the internet https://www.engineering.com, Jun. 26, 2014, 7 pages.

Boyle, "Metamaterial Can Squirt a Magnetic Field Through a Hose", Popular Science, Apr. 25, 2013, 3 pages.

Cartlidge, "Introducing the Magnetic Hose", Physicsworld.com, May 1, 2013, 3 pages.

U.S. Appl. No. 15/857,559, "Non-Final Office Action," dated Jun. 4, 2019, 8 pages.

EP 18216004.4, "Extended European Search Report," dated May 14, 2019, 10 pages.

JP 2018-242025, "Office Action," dated Jun. 4, 2019, 9 pages.

KR 10-2018-0168293, "Office Action," dated Jul. 22, 2019, 10 pages.

Japanese Application No. JP2018-242025, "Office Action", dated Oct. 23, 2019, 4 pages.

* cited by examiner

SYSTEMS AND METHODS FOR LONG-RANGE INTERACTIONS FOR VIRTUAL REALITY

CROSS-REFERENCE TO RELATED APPLICATIONS

This Application is a continuation of and claims the benefit of U.S. application Ser. No. 15/857,559, filed on Dec. 28, 2017, and entitled "Systems and Methods for Long-Range Interactions for Virtual Reality," the entirety of which is hereby incorporated by reference herein.

FIELD OF THE INVENTION

The present application relates to the field of user interface devices. More specifically, the present application relates to virtual reality controllers with haptics.

BACKGROUND

Virtual Reality ("VR") applications have become increasingly popular. Handheld controllers, including touch-enabled devices, are often used to interact with such applications. Some such devices may be configured with haptic actuators that provide vibrotactile effects to users of the VR applications, however, such devices may lack the capability to provide kinesthetic feedback. Accordingly, there is a need for kinesthetic haptic effects in virtual reality environments.

SUMMARY

Various examples are described for systems and methods for long-range interactions for virtual reality. In one embodiment, a system according to the present disclosure comprises: a handheld interface device; a sensor configured to detect movement of the handheld interface device and transmit a sensor signal associated with the movement; a processor coupled to the sensor and configured to: determine a haptic signal based in part on the sensor signal; and control, based on the haptic signal, an electromagnetic source remote from the handheld interface device to output a magnetic field to apply a force to magnetic material in the handheld interface device to output a haptic effect to a user of the handheld interface device.

In another embodiment, a method according to the present disclosure comprises: detecting movement of a handheld interface device; determining a haptic signal based in part on the movement of the handheld interface device; and controlling, based on the haptic signal, an electromagnetic source remote from the handheld interface device to output a magnetic field to apply a force to magnetic material in the handheld interface device to output a haptic effect to a user of the handheld interface device.

In yet another embodiment, a computer readable medium may comprise program code, which when executed by a processor is configured to enable the processor to: detect movement of a handheld interface device; determine haptic signal based in part on the movement of the handheld interface device; and control, based on the haptic signal, an electromagnetic source remote from the handheld interface device to output a magnetic field to apply a force to magnetic material in the handheld interface device to output a haptic effect to a user of the handheld interface device.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
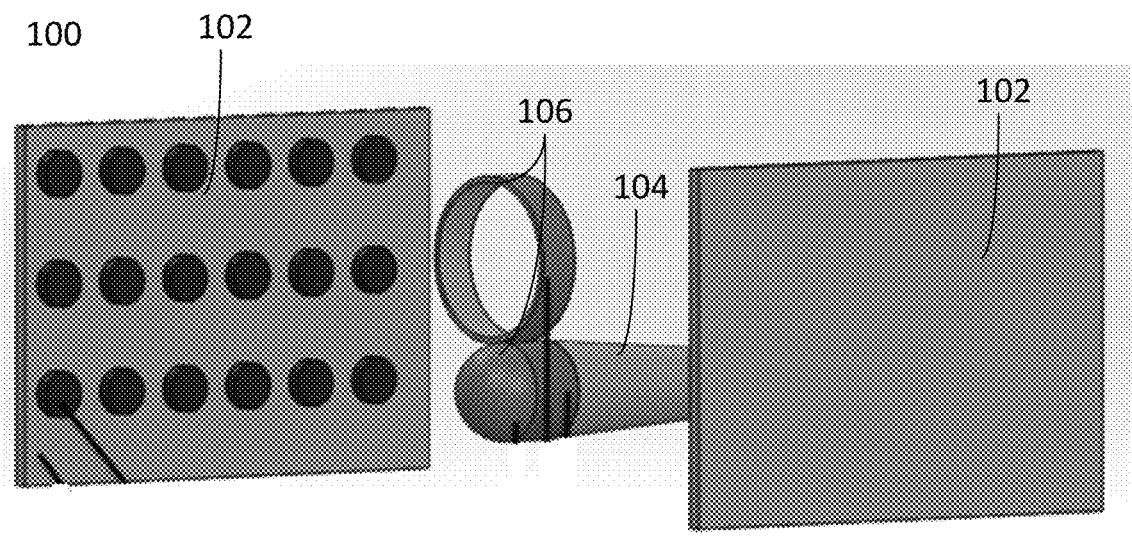
FIG. 1A shows an illustrative system for long-range interactions for virtual reality according to one embodiment of the present disclosure.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Long-Range Interactions for Virtual Reality

One illustrative embodiment is a virtual reality (VR) gaming system in wireless communication with one or more VR interface devices. As used herein, the term virtual reality includes a virtual environment or an augmented environment, e.g., augmented reality (AR). The VR interface device allows a user to interact with a virtual environment and with objects in the virtual environment. For example, as the user moves the VR interface device, one or more sensors detect the movement and this movement is translated to corresponding movement in the virtual environment. The VR gaming system may output haptic effects to the user of the VR interface device. These haptic effects comprise touch or feel based effects and may enhance the reality of interactions in the virtual environment. An illustrative embodiment of the present disclosure is configured to output long-range haptic effects using magnetic fields.

In the illustrative embodiment, a VR interface device is in wireless communication with a VR control system. As the user interacts with the VR interface device (e.g., by moving it) sensors detect the movement and transmit data associated with the movement to the VR control system. The VR control system then determines haptic effects to output to the user. In some embodiments, the haptic effects may be determined based in part on one or more of: movement of the VR interface device, position of the VR interface device, orientation of the VR interface device, distance from the VR interface device to the magnetic field generating device, and/or objects or interactions in the VR environment.

In the illustrative embodiment, the VR control system outputs one or more haptic effects to the VR interface device via magnetic fields. The VR interface device further comprises one or more magnetic materials (e.g., a permanent magnet or a ferromagnetic coating). The VR control system is configured to control one or more magnetic field generating devices (e.g., plates comprising one or more coils configured to output magnetic fields). These magnetic fields interact with the magnetic materials in the VR interface device and output forces that are perceived by the user of the VR interface device.

Force on the VR interface device may simulate multiple haptic effects. For example, in one embodiment a user may press on a door or other object in the virtual environment. As the user presses on the door, the VR control device may determine a haptic effect and output signals to the magnetic field generating devices to output a magnetic field. This magnetic field applies forces to the VR interface device, simulating forces the user would feel when pressing on an actual door. Further, as the user moves the virtual door, the VR control device may determine different haptic effects should be output. Based on this determination, the VR control device may output different or additional magnetic fields, causing the user to feel different forces while pressing on the virtual door. This may more realistically simulate the feel of movement of an actual door. This is just one example of forces that may be output. In other embodiments additional forces may simulate other types of interactions, e.g., a resistive force as a user moves his or her hand through virtual water or forces that simulate weight as a user lifts a virtual ball.

In the illustrative embodiment, the magnetic field generating devices may comprise a plurality of devices (e.g., a plurality of plates positioned around the VR interface device). In the illustrative embodiment, this enables a plurality of different forces to be output to the VR interface device. Further, in some embodiments, the VR control device may be integrated into the VR interface, e.g., the VR control device and VR interface may both be integrated into a smartphone. In such an embodiment, the magnetic field generating devices would be external to the VR interface device and controlled via a wired or wireless network connection.

In the illustrative embodiment, the VR interface device may further be configured to output vibration-based haptic effects to the user. For example, in some embodiments, actuators or other devices may be included on the VR interface device and controlled to output vibration based effects. Alternatively, in some embodiments, other types of haptic output devices may be included in the VR interface device to output a broader range of haptic effects.

This illustrative example is given to introduce the reader to the general subject matter discussed herein and the disclosure is not limited to this example. The following sections describe various additional non-limiting examples and examples of the present disclosure.

Illustrative Systems for Long-Range Interactions for Virtual Reality

Figure 1B:
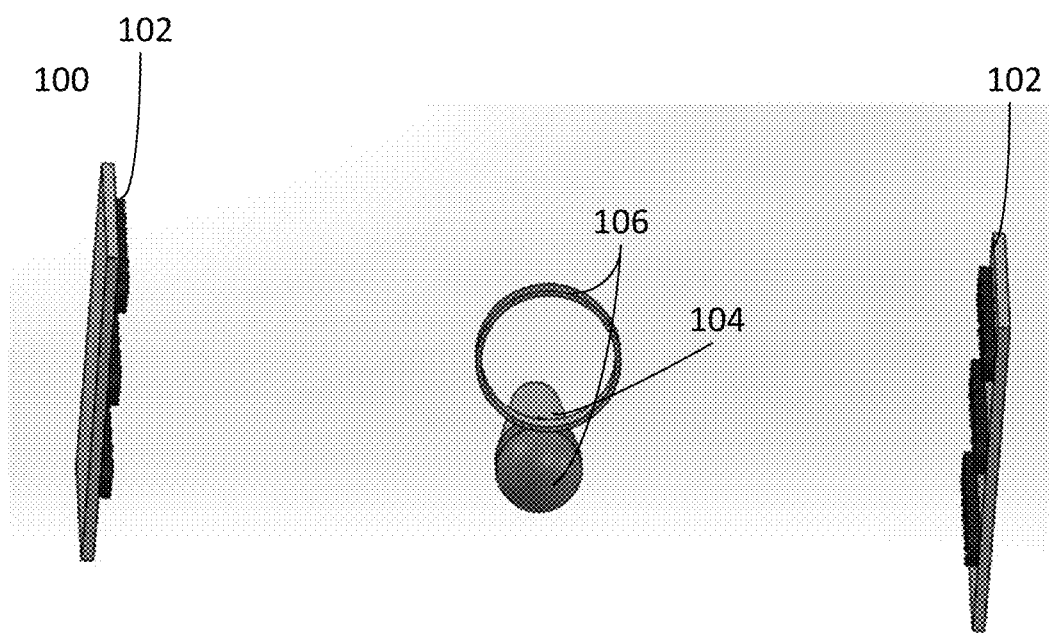
FIG. 1B shows another illustrative system for long-range interactions for virtual reality according to one embodiment of the present disclosure.

FIGS. 1A and 1B show two views of an illustrative system 100 for long-range interactions for virtual reality. As is shown in FIGS. 1A and 1B, the system 100 comprises two magnetic field generating devices 102, a VR interface device 104, and magnetic material 106.

The magnetic field generating devices 102 comprise two plates positioned on either side of VR interface device 104. Each of the magnetic field generating devices comprises a plurality of coils (e.g., conductors formed into one or more loops) configured to generate magnetic fields when current is applied. In some embodiments, these coils may comprise air-core coils or ferrite-core coils. In other embodiments, additional magnetic field generating devices may be included, e.g., a magnetic field generating device above or below the VR interface device 104, or in a depth dimension away from the VR interface device 104. Further, in some embodiments, magnetic field generating devices 102 may be moveable, e.g., they may be mounted on an articulated arm. In such an embodiment, a controller may move the magnetic field generating devices 102 to maintain a substantially constant distance between the magnetic field generating devices 102 and VR interface device 104.

VR interface device 104 comprises an interface device for use by a user to interact in a VR or AR environment. As the user interacts with the VR interface device 104, one or more sensors detect movements of the VR interface device 104 and transmit signals associated with the movement to a VR control device. The VR control device then interprets these movements and applies them to a virtual environment, e.g., as the user moves VR interface device 104 the VR control device shows corresponding movements in the virtual environment.

In some embodiments, the VR interface device 104 may comprise a handheld controller (e.g., a controller comprising one or more sensors, buttons, and manipulanda for interacting in a virtual environment). In some embodiments, the VR interface device 104 comprises processing capability to generate aspects of the virtual environment, e.g., the VR interface device may comprise a smartphone or tablet computer in wired or wireless communication with magnetic field generating devices 102.

VR interface device 104 further comprises magnetic material 106, which comprises one or more of ferromagnetic, magnetic material, or electro-magnetic materials. In some embodiments, magnetic material 106 may comprise a fixed permanent magnet. Further, in some embodiments, magnetic material 106 may comprise a ferromagnetic coating on VR interface device 104. In some embodiments, the magnetic material 106 may comprise a shape configured to increase the force or modify the torque of the force output by the magnetic field on the VR interface device 104. In the embodiment shown in FIG. 1A, the magnetic material 106 comprises a circular hoop. In other embodiments, the magnetic material 106 may comprise a different shape, e.g., a square, cube, or other shape to modify the force or torque of the force output by the magnetic field on VR interface device 104.

As the user interacts with VR interface device 104 a processor in a VR controller will determine one or more forces to output. The processor then controls the magnetic field generating devices 102 to output magnetic fields. The magnetic fields act on magnetic material 106 and apply a force to the VR interface device 104. The user will feel the force on VR interface device 104. This force may simulate interactions in the virtual environment, e.g., a weight or resistance as the user lifts an object or moves through an area. Further, these forces may aid the user's movement, e.g., a magnetic field may simulate the feeling of being pushed or pulled in a direction.

Figure 2:
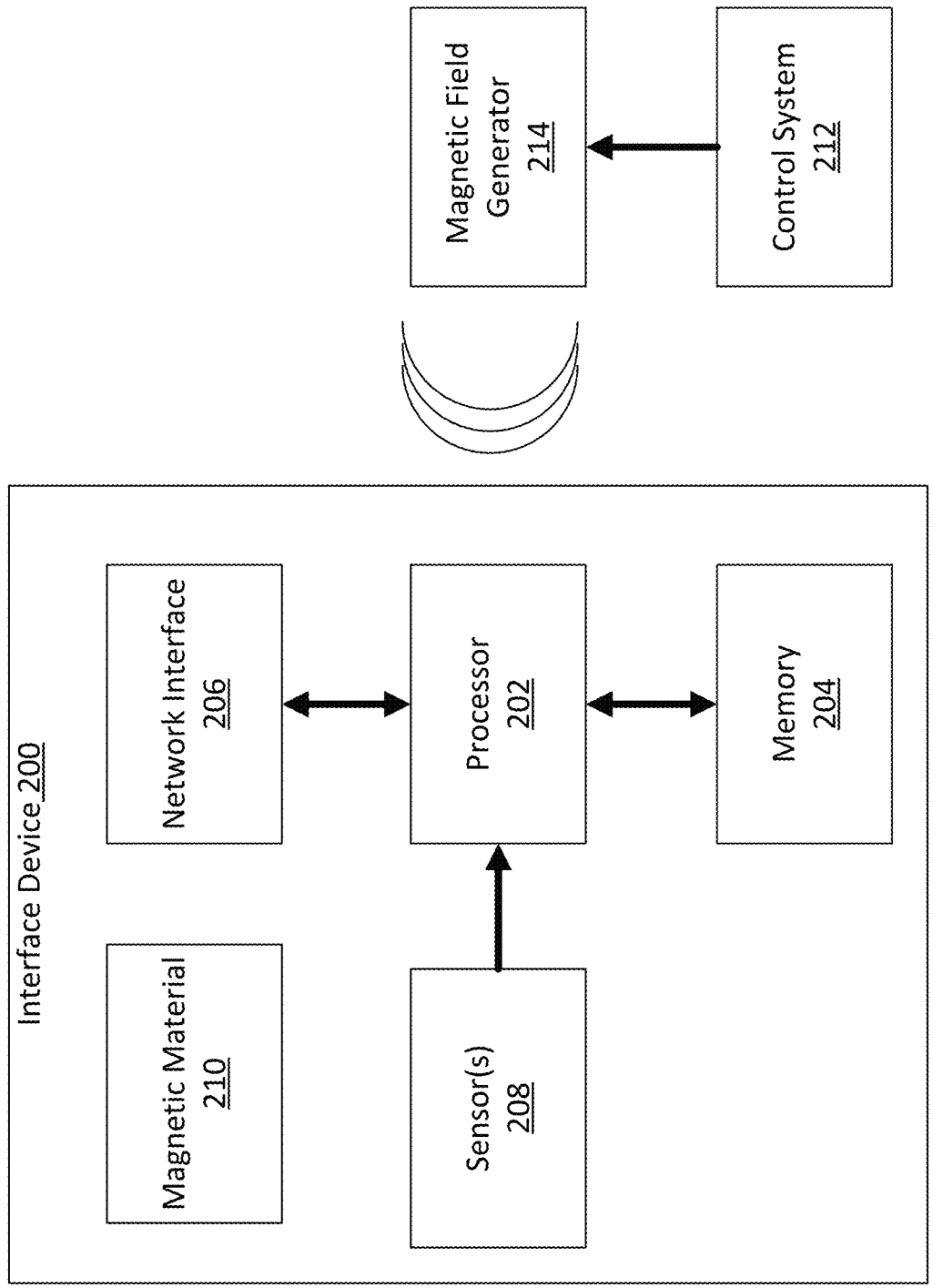
FIG. 2 shows another illustrative system for long-range interactions for virtual reality according to one embodiment of the present disclosure.

Turning now to FIG. 2, FIG. 2 shows another illustrative system for long-range interactions for virtual reality. As is shown in FIG. 2, the system comprises an interface device 200, which comprises a processor 202, memory 204, network interface 206, sensors 208, and magnetic material 210. The system further comprises a VR control system 214 and a magnetic field generator 212.

As shown in FIG. 2, processor 202 is in communication with a memory 204, which can comprise any suitable tangible (and non-transitory) computer-readable medium such as Random Access Memory ("RAM"), Read Only Memory ("ROM"), Electrically Erasable Programmable Read-Only Memory ("EEPROM"), or the like, and embodies program components that configure operation of the computing device.

Processor 202 is further in communication with one or more network interfaces 206, which may facilitate communication with a remote device, e.g., a control device such as a gaming system or VR controller. Network interface 206 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

Processor 202 is further in communication with one or more sensors 208. Sensor(s) 208 comprise one or more sensors configured to detect movement of the interface device 200 (e.g., accelerometers, gyroscopes, cameras, GPS, or other sensors). These sensors may be configured to detect user interaction that moves the interface device 200 in the X, Y, or Z plane. In some embodiments, processor 202 is configured to make determinations regarding movement and location based on data received from sensors 208. Further, in some embodiments, processor 202 is configured to transmit data received from sensors 208 to a remote device (such as VR control system 214), e.g., using network interface 206. In some embodiments, this remote device may comprise a virtual reality system configured to determine haptic effects and transmit signals associated with those haptic effects back to processor 202. Further, in some embodiments, one or more sensors 208 may be external to interface device 200.

In some embodiments, one or more sensors 208 are configured to detect multiple aspects of the user interaction. For example, sensor 208 may detect the speed and pressure of a user interaction, and incorporate this information into a sensor signal. Further, in some embodiments, the user interaction comprises a multi-dimensional user interaction away from the device. For example, in some embodiments, a camera associated with the device may be configured to detect user movements, e.g., hand, finger, body, head, eye, or feet motions or interactions with another person or object.

As shown in FIG. 2, the interface device 200 further comprises a magnetic material 210. Magnetic material 210 may comprise a permanent or electro magnet coupled within or to interface device 200. Alternatively or additionally, magnetic material 210 may comprise a ferromagnetic coating on all or part of interface device 200.

In some embodiments, interface device 200 may further comprise one or more haptic output devices in communication with processor 202. The haptic output device may provide vibrotactile haptic effects. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment the haptic output devices may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device may comprise a plurality of actuators, for example an ERM and an LRA. In still other embodiments, the haptic output device may use non-actuated haptics (e.g., air, fluid, or ultrasonic output) that provide resistance as a means to convey rougher surfaces.

As shown in FIG. 2 the system further comprises a control system 212. Control system 212 may comprise a control device for a virtual reality system. Control system 212 comprises a network interface which may receive data captured by sensor(s) 208 via network interface. Further, in some embodiments, control system 212 may comprise additional sensors to detect data about movements and positioning of interface device 200. Control system 212 determines haptic effects to output to interface device 200. In some embodiments, the haptic effects may be determined based in part on one or more of: movement of the VR interface device, position of the VR interface device, orientation of the VR interface device, distance from the VR interface device to the magnetic field generating device, and/or objects or interactions in the VR environment.

As shown in FIG. 2, the control system 212 is communicatively coupled to one or more magnetic field generators 214. The one or more magnetic field generators 214 comprise one or more coils (e.g., conductors formed into one or more loops) configured to generate magnetic fields when current is applied. In some embodiments, these coils may comprise air-core or ferrite-core coil. In some embodiments, the one or more magnetic field generators 214 may be moveable, e.g., they may be mounted on an articulated arm. In such an embodiment, a controller may move the magnetic field generators 214 to maintain a substantially constant distance between them and interface device 200.

Control system 212 controls magnetic field generators 214 to output magnetic fields. These magnetic fields act on magnetic material 210 to output a force to interface device 200, which the user of the interface device 200 will perceive as a haptic effect. In some embodiments, components or functionality of control system 212 may be part of interface device 200. For example, interface device 200 may comprise a smartphone or table with processing capability to determine a virtual reality environment and haptic effects. In such an embodiment, interface device 200 may be in wired or wireless communication with magnetic field generators 214 and control them to output forces to interface device 200.

Figure 3:
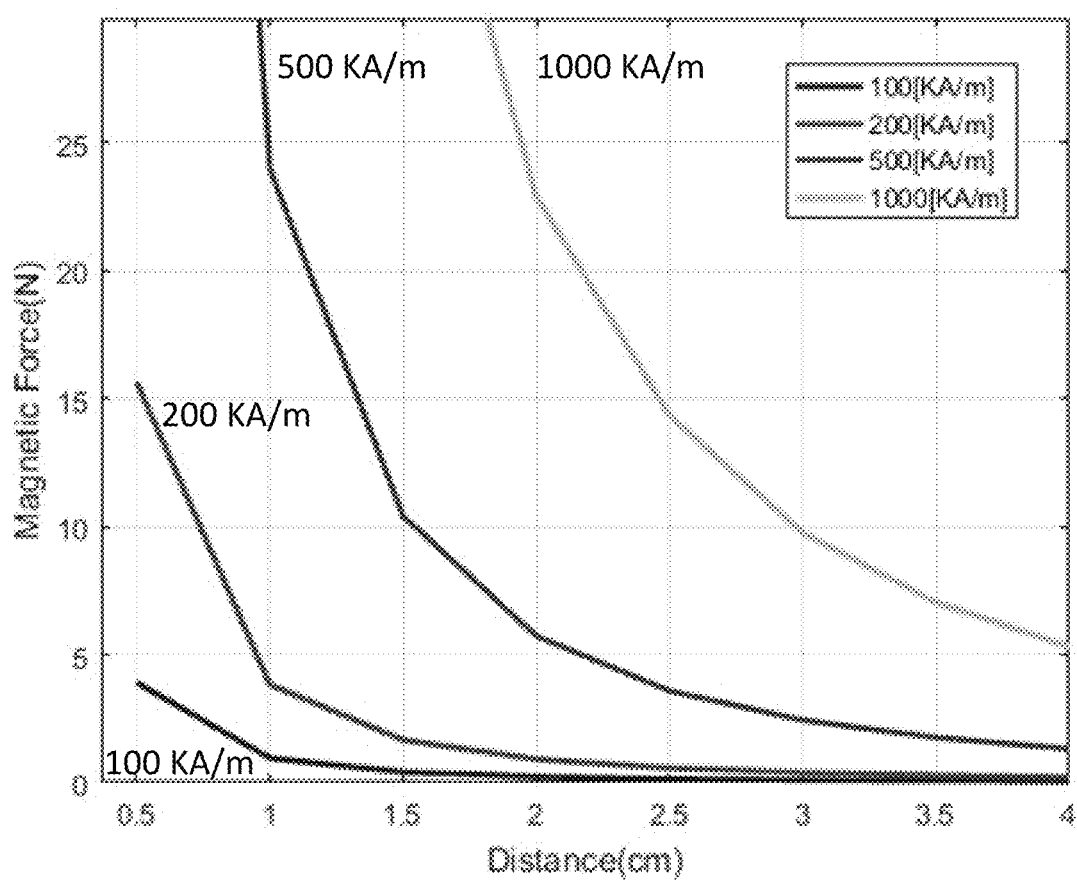
FIG. 3 shows a graph that is illustrative of force output by embodiments of a system for long-range interactions for virtual reality according to some embodiments of the present disclosure.

Turning now to FIG. 3, FIG. 3 shows a graph that is illustrative of force output by embodiments of a system for long-range interactions for virtual reality. The graph compares the magnetic force output to an object as it moves further away from the magnetic field generating device (e.g., the coil). The graph shows this decline in value at four different values of Kilo-Amp per meter of coil thickness, 100 KA/m, 200 KA/m, 500 KA/m, and 1,000 KA/m.

Illustrative Method for Long-Range Interactions for Virtual Reality

Figure 4:
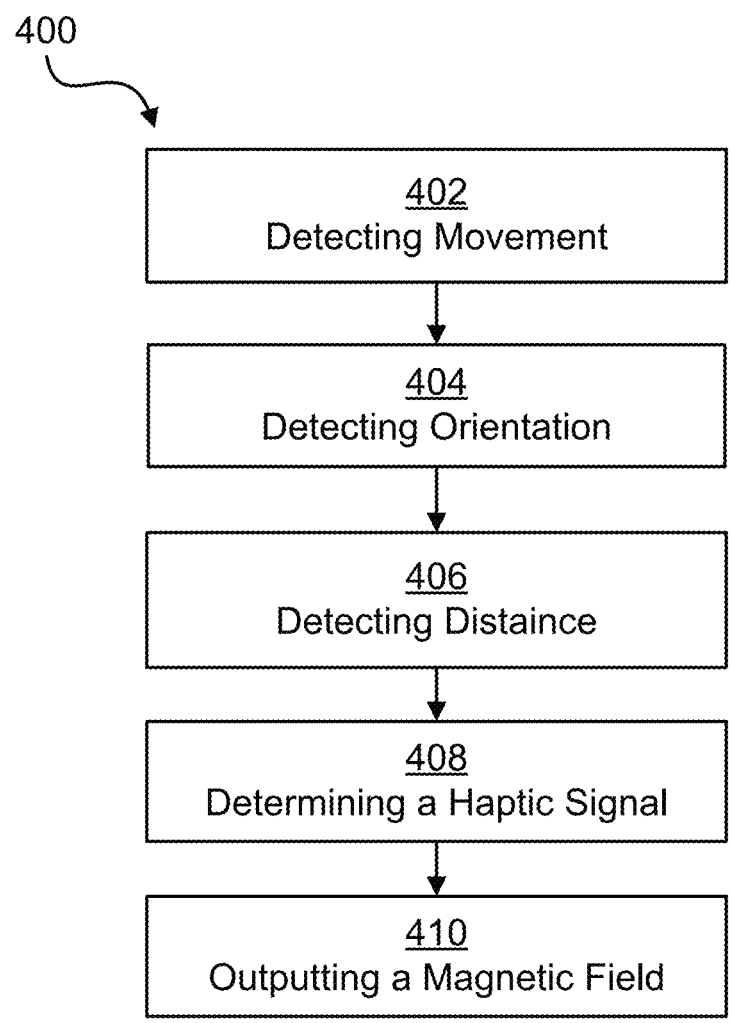
FIG. 4 is a flow chart of method steps for one example embodiment for controlling an illustrative system for long-range interactions for virtual reality according to one embodiment of the present disclosure.

Referring now to FIG. 4, FIG. 4 shows an example method 400 for long-range interactions for virtual reality. In some embodiments, the steps in FIG. 4 may be performed in a different order. Alternatively, in some embodiments, one or more of the steps shown in FIG. 4 may be skipped, or additional steps not shown in FIG. 4 may be performed. The steps below are described with reference to components described above with regard to the system shown in FIG. 2

The method begins at step 402 when control system 212 receives a signal associated with movement of interface device 200 from sensor 208. The sensor 208 may comprise a sensor internal to interface device 200 that transmits sensor data to control system 212. Alternatively, in some embodiments, the control system may comprise its own sensors to track interface device 200.

At step 404 the control system 212 receives a signal associated with orientation of interface device 200 from sensor 208. In some embodiments, the orientation of interface device 200 may comprise an orientation of magnetic material 210 of interface device 200. For example, the orientation of the magnetic material 210 may impact the type of force output on interface device 200 when a magnetic field is output.

At step 406 the control system 212 receives a signal associated with distance of interface device 200 from sensor 208. The distance may comprise a distance between interface device 200 and magnetic field generator 214. Further, in some embodiments, the one or more magnetic field generators 214 may be moveable, e.g., they may be mounted on an articulated arm. In such an embodiment, control system 212 may move the magnetic field generators 214 to maintain a substantially constant distance between the magnetic field generators 214 and interface device 200.

At step 408 the control system 212 determines a haptic signal. In some embodiments, the control system 212 may determine the haptic signal based in part on one or more of: movement of the interface device 200, position of the interface device 200, orientation of the interface device 200, distance from the interface 200 device to the magnetic field generators 214, and/or objects or interactions in a virtual environment. For example, a higher current may be required to generate a stronger magnetic field if the interface device 200 is further away from magnetic field generators 214. Further, in some embodiments, the control system 212 may determine a haptic effect that varies as the user moves, e.g., to simulate wind blowing at various speeds on the user, and thus may determine a magnetic field that is continuously varying in intensity.

Then at step 410 the control system 212 outputs a magnetic field using one or more magnetic field generators 214. The magnetic field acts on magnetic material 210 to output a force that the user perceives. This force acts as a haptic effect, which may simulate an interaction in a virtual environment.

Embodiments of the present disclosure may be utilized in a variety of different applications. For example, embodiments may be used in a variety of gaming application, such as car racing simulator, a simulator of turning a knob, or a simulation that involves rotating an object. For example, embodiments might be useful in commercial simulations as well, such as surgery or working in a weightless environment. Another example might be in simulating a cooking environment where actions such as picking up fruit or interacting with devices such as a blender could be simulated. Other examples might include working as an automobile or aircraft mechanic.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the present disclosure. Also, a number of steps may be undertaken before, during, or after the above elements are considered. Accordingly, the above description does not bound the scope of the claims.

The use of "adapted to" or "configured to" herein is meant as an open and inclusive statement that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a sensor configured to detect movement of an interface device and transmit a sensor signal associated with the movement;
   a processor coupled to the sensor and configured to:
   determine a haptic signal based in part on the sensor signal; and
   control, based on the haptic signal, an electromagnetic source remote from the interface device to output a magnetic field to apply a force to magnetic material in the interface device to output a force onto the interface device, wherein the interface device comprises a mobile telephone.

2. The system of claim 1, wherein the sensor is further configured to detect an orientation of the interface device and wherein the processor is further configured to determine the haptic signal based in part on the orientation of the interface device.

3. The system of claim 1, wherein the sensor is further configured to detect a distance between the electromagnetic source and the interface device, and wherein the processor is further configured to determine the haptic signal based in part on the distance.

4. The system of claim 1, wherein the interface device comprises a user interface device for a virtual reality system or an augmented reality system.

5. The system of claim 1, wherein the interface device is communicatively coupled to a virtual reality system or an augmented reality system.

6. The system of claim 1, wherein the electromagnetic source comprises one or more panels near the interface device.

7. A method comprising:
   detecting movement of an interface device;
   determining a haptic signal based in part on the movement of the interface device; and
   controlling, based on the haptic signal, an electromagnetic source remote from the interface device to output a magnetic field to apply a force to magnetic material in the interface device to output a force onto the interface device, wherein the interface device comprises a mobile telephone.

8. The method of claim 7, further comprising detecting an orientation of the interface device and determining the haptic signal based in part on the orientation of the interface device.

9. The method of claim 7, further comprising detecting a distance between the electromagnetic source and the interface device and determining the haptic signal based in part on the distance.

10. The method of claim 7, wherein the interface device comprises a user interface device for a virtual reality system or an augmented reality system.

11. The method of claim 10, wherein the movement is detected by a sensor coupled within the interface device.

12. The method of claim 7, wherein the interface device is communicatively coupled to a virtual reality system or an augmented reality system.

13. The method of claim 7, wherein the electromagnetic source comprises one or more panels near the interface device.

14. A non-transitory computer readable medium comprising program code, which when executed by a processor is configured to cause the processor to:
   detect movement of an interface device;
   determine a haptic signal based in part on the movement of the interface device; and
   control, based on the haptic signal, an electromagnetic source remote from the interface device to output a magnetic field to apply a force to magnetic material in the interface device to output a force onto the interface device, wherein the interface device comprises a mobile telephone.

15. The non-transitory computer readable medium of claim 14, wherein the interface device comprises a user interface device for a virtual reality system or an augmented reality system.

16. The non-transitory computer readable medium of claim 15, wherein the movement is detected by a sensor coupled within the interface device.

17. The non-transitory computer readable medium of claim 14, wherein the electromagnetic source comprises one or more panels near the interface device.

* * * * *